(12) United States Patent
Feltham et al.

(10) Patent No.: US 12,409,762 B2
(45) Date of Patent: *Sep. 9, 2025

(54) VEHICLE SEAT WITH AIRFLOW OUTLETS

(71) Applicant: Rivian IP Holdings, LLC, Irvine, CA (US)

(72) Inventors: Graham Lloyd Feltham, Garden City, MI (US); Jon DeBoer, Mission Viejo, CA (US)

(73) Assignee: Rivian IP Holdings, LLC

( * ) Notice: Subject to any disclaimer, the term of this patent is extended or adjusted under 35 U.S.C. 154(b) by 181 days.

This patent is subject to a terminal disclaimer.

(21) Appl. No.: 18/206,759

(22) Filed: Jun. 7, 2023

(65) Prior Publication Data

US 2023/0391237 A1    Dec. 7, 2023

Related U.S. Application Data

(63) Continuation of application No. 17/504,946, filed on Oct. 19, 2021, now Pat. No. 11,701,988.

(51) Int. Cl.
*A47C 31/00* (2006.01)
*A47C 7/74* (2006.01)
*B60N 2/56* (2006.01)
*B60N 2/70* (2006.01)

(52) U.S. Cl.
CPC ......... *B60N 2/5642* (2013.01); *B60N 2/5628* (2013.01)

(58) Field of Classification Search
CPC ............................ B60N 2/5635; B60N 2/5657
See application file for complete search history.

(56) References Cited

U.S. PATENT DOCUMENTS

| | | | | |
|---|---|---|---|---|
| 6,059,018 A * | 5/2000 | Yoshinori | .......... | B60H 1/00285 165/41 |
| 6,179,706 B1 * | 1/2001 | Yoshinori | ............ | B60N 2/5657 297/180.14 |
| 6,196,627 B1 * | 3/2001 | Faust | ................... | B60N 2/5635 297/180.14 |
| 6,644,735 B2 * | 11/2003 | Bargheer | ............. | B60N 2/5657 297/452.47 |
| 7,506,924 B2 * | 3/2009 | Bargheer | ............. | B60N 2/5621 297/180.14 |
| 7,587,901 B2 * | 9/2009 | Petrovski | ............. | B60N 2/5657 62/3.61 |

(Continued)

OTHER PUBLICATIONS

List of references in corresponding Utility U.S. Appl. No. 17/504,946.

*Primary Examiner* — Shin H Kim
(74) *Attorney, Agent, or Firm* — FOLEY & LARDNER LLP

(57) ABSTRACT

Various embodiments include illustrative vehicle seats, systems, vehicles, and methods for circulating airflow through a vehicle seat. An illustrative vehicle seat includes a cushion. The cushion is adapted to provide airflow therethrough. The cushion defines a primary airflow path directed to a primary outlet formed in a supporting portion of the cushion. The supporting portion of the cushion is adapted to receive direct body contact with a vehicle occupant while the vehicle occupant is seated within the vehicle seat. The cushion also defines a secondary airflow path directed to a secondary outlet formed in a non-supporting portion of the cushion.

17 Claims, 10 Drawing Sheets

(56) References Cited

U.S. PATENT DOCUMENTS

| | | | | |
|---|---|---|---|---|
| 7,708,626 B2* | 5/2010 | Bargheer | B60N 2/5635 |
| | | | | 62/3.5 |
| 7,827,805 B2* | 11/2010 | Comiskey | B60N 2/5692 |
| | | | | 62/3.61 |
| 9,440,572 B2* | 9/2016 | Hall | B60N 2/5657 |
| 10,358,062 B2* | 7/2019 | Arata | B60N 2/5657 |
| 10,471,865 B2* | 11/2019 | Kato | B60N 2/5657 |
| 10,933,780 B2* | 3/2021 | Rappl | B60H 1/246 |
| 11,208,016 B2* | 12/2021 | Longatte | B60N 2/5671 |
| 11,535,131 B1* | 12/2022 | Feltham | B60N 2/5628 |
| 11,701,988 B2* | 7/2023 | Feltham | B60N 2/5671 |
| | | | | 297/452.47 |
| 2007/0234742 A1* | 10/2007 | Aoki | B60H 1/00285 |
| | | | | 62/3.3 |
| 2013/0165033 A1* | 6/2013 | Fitzpatrick | B60N 2/5671 |
| | | | | 454/120 |
| 2019/0283636 A1* | 9/2019 | Imaizumi | B60N 2/5628 |

* cited by examiner

VEHICLE SEAT WITH AIRFLOW OUTLETS

CROSS-REFERENCE TO RELATED APPLICATION

The present disclosure is a continuation of co-pending U.S. patent application Ser. No. 17/504,946, filed on Oct. 19, 2021, and entitled "VEHICLE SEAT WITH AIRFLOW OUTLETS," which claims the benefit of priority of then co-pending U.S. Provisional Patent Application 63/237,211, filed on Aug. 26, 2021, and entitled "VEHICLE SEAT WITH AIRFLOW OUTLETS," the contents of both of which are incorporated in full by reference herein.

INTRODUCTION

The present disclosure relates generally to vehicle seats and the providing of airflow thereto.

Modern vehicles utilize various mechanisms to maintain the comfort of vehicle occupants. One of these mechanisms is a seat that receives airflow, such as conditioned airflow that is heated and/or cooled. These vehicle seats are adapted to receive an airflow from an airflow system, such as a Heating, Ventilation, and Air Conditioning (HVAC) system, and utilize that airflow to provide comfort to the occupant. Such comfort is important, particularly in an adventure vehicle or the like where the occupant might be travelling in remote areas and might be exposed to extreme hot/cold temperatures, for example.

The present background is provided by way of illustrative environmental context only. It will be readily apparent to those of ordinary skill in the art that the principles of the present disclosure may be implemented in other environmental contexts equally.

BRIEF SUMMARY

Various disclosed embodiments include illustrative vehicle seats, systems, vehicles, and methods for circulating airflow through a vehicle seat.

In one illustrative embodiment, the present disclosure provides a vehicle seat. The vehicle seat includes a cushion. The cushion is adapted to provide airflow therethrough. The cushion defines a primary airflow path directed to a primary outlet formed in a supporting portion of the cushion. The supporting portion of the cushion is adapted to receive direct body contact with a vehicle occupant while the vehicle occupant is seated within the vehicle seat. The cushion also defines a secondary airflow path directed to a secondary outlet formed in a non-supporting portion of the cushion.

In another illustrative embodiment, the present disclosure provides an airflow system. The airflow system includes an airflow unit, a supply duct, and a vehicle seat. The airflow unit includes a controller adapted to control a flow of air. The supply duct is adapted to direct the air from the airflow unit. The vehicle seat includes a cushion adapted to receive the air from the supply duct and provide airflow therethrough. The cushion defines a primary airflow path directed to a primary outlet formed in a supporting portion of the cushion. The supporting portion of the cushion is adapted to receive direct body contact with a vehicle occupant while the vehicle occupant is seated within the vehicle seat. The cushion also defines a secondary airflow path directed to a secondary outlet formed in a non-supporting portion of the cushion.

In a further illustrative embodiment, the present disclosure provides a vehicle. The vehicle includes a chassis, a cabin, an airflow system, and a vehicle seat. The airflow system includes and airflow unit and a supply duct. The airflow unit includes a controller adapted to control a flow of air. The supply duct is adapted to direct the air from the airflow unit. The vehicle seat is disposed in the cabin and includes a cushion adapted to receive the air from the supply duct and provide airflow therethrough. The cushion defines a primary airflow path directed to a primary outlet formed in a supporting portion of the cushion. The supporting portion of the cushion is adapted to receive direct body contact with a vehicle occupant while the vehicle occupant is seated within the vehicle seat. The cushion also defines a secondary airflow path directed to a secondary outlet formed in a non-supporting portion of the cushion.

In yet another illustrative embodiment, the present disclosure provides a method for circulating airflow through a vehicle seat. The method includes providing an airflow to a cushion adapted to provide a flow of air therethrough, the cushion including a padding defining a secondary outlet formed at or adjacent to an end thereof. The method also includes directing the airflow through the cushion such that a primary airflow flows to a primary outlet formed in in a supporting portion of the cushion, the supporting portion of the cushion is adapted to receive direct body contact with a vehicle occupant while the vehicle occupant is seated within the vehicle seat, and a secondary airflow path directed to a secondary outlet formed in a non-supporting portion of the cushion.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Given by way of non-limiting overview, various disclosed embodiments include illustrative vehicle seats, systems, vehicles, and methods for circulating airflow through a vehicle seat. Given by way of non-limiting example provided by way of illustration only, the present disclosure provides, among other illustrative embodiments, an illustrative vehicle seat adapted for an airflow system, such as an HVAC system, that provides airflow, such as a conditioned airflow (heated or cooled air from an HVAC unit) to provide increased comfort for an occupant of the vehicle seat. In particular, the air is directed through airflow channels formed in one or more cushions of the seat, such as the seat cushion and the backrest cushion. The airflow channels direct the conditioned air through padding of the cushion and to primary outlets, that are located in a supporting portion of the cushion, such as being centrally located in the cushion and generally located at the surfaces of the cushion that adjoin the occupant in the vehicle seat. The supporting portion of the cushion is adapted to receive direct body contact with a vehicle occupant while the vehicle occupant is seated within the vehicle seat. At least one of the airflow channels directs the airflow to secondary outlets that are located in a non-supporting portion of the cushion, such as at or adjacent to an end and an edge of the cushion, such as at a front of the padding of the seat cushion or at a top of the padding of the backrest cushion. As such, the secondary outlets are generally positioned in locations that are not obstructed by the occupant while the occupant is seated in the vehicle seat. The secondary outlets are adapted to direct the airflow towards one or more of the occupant's head, neck, shoulders, arms, legs, feet, back of knees, and the arms. By positioning the secondary outlets in non-supporting portions of the cushion, such as at or adjacent to the ends/edges of the cushion, flow of the air through the cushion can be maintained even when some of the primary outlets are being obstructed by the occupant of the vehicle seat, which can improve the overall comfort and/or conditioning of the vehicle and reduce strain on the airflow/HVAC system. In some embodiments, at least one of the airflow channels is positioned at a depth that is offset from the surface of the padding that adjoins the occupant of the vehicle seat, such that the at least one of the airflow channels remains at least partially unobstructed. At least one of the airflow channels offset from the surface of the cushion is also in fluid communication with the secondary outlet, which further ensures that the airflow continues to flow even when the occupant of the vehicle seat is present. The above overview is given by way of illustration only and is not intended to be limiting whatsoever. As such, no limitation is to be inferred.

Figure 1:
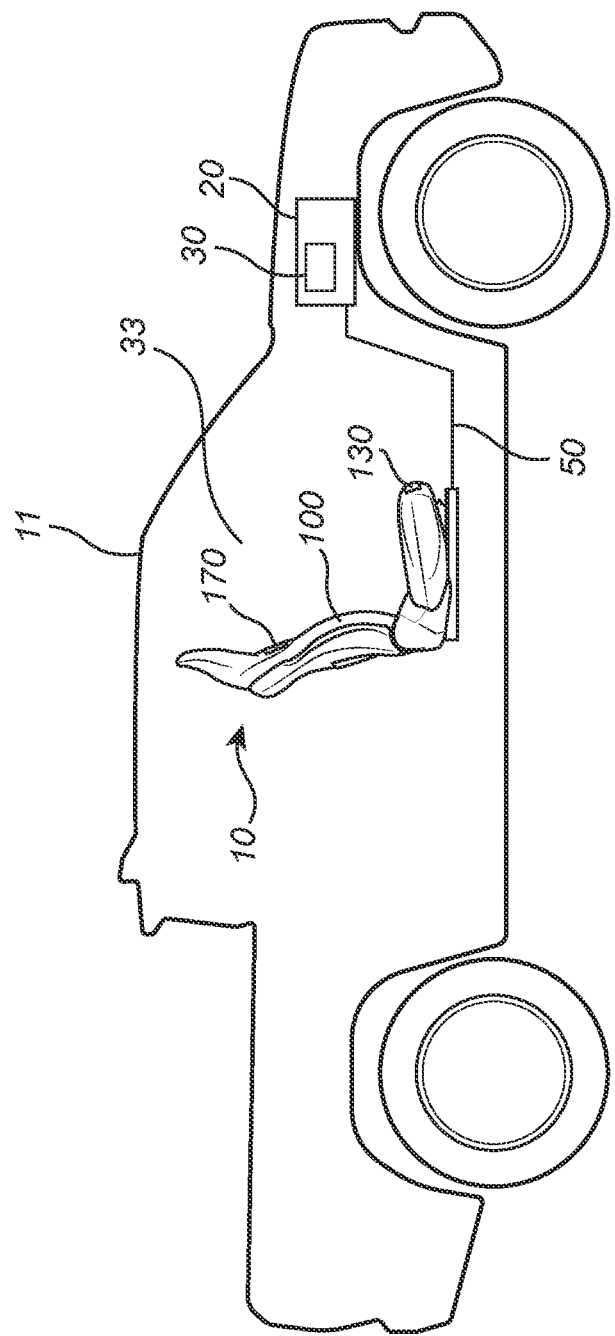
FIG. 1 is a schematic illustration of an illustrative embodiment of a vehicle with an airflow system of the present disclosure, highlighting secondary outlets in a vehicle seat.

FIG. 1 is a schematic illustration of an illustrative embodiment of a vehicle 11 with an airflow system 10 of the present disclosure, highlighting secondary outlets 170, 130 in a vehicle seat 100. Referring now specifically to FIG. 1, in various illustrative embodiments, the vehicle 11 includes the airflow system and at least one vehicle seat 100. In various embodiments, the vehicle 11 includes a cabin 33. The vehicle can be any vehicle, such as an electric vehicle, a hybrid vehicle, a car, a truck, an SUV, a van, a marine vessel, an aircraft, a train, and the like. In various embodiments the vehicle seat 100 is disposed in the cabin 33. In other embodiments, the seat may be used for office chairs, gaming chairs, theater seating, and the like.

In various embodiments the airflow system 10 includes an airflow unit and a controller 30. In various embodiments, one or more vehicle seats 100 are included in the airflow system 10. In various embodiments, the airflow unit 20 includes a fan (not pictured) that is adapted to supply air to the vehicle cabin and to the one or more vehicle seats 100 via one or more supply ducts 50. In various embodiments, the airflow unit 20 is any suitable airflow unit, such as an HVAC unit or the like, that is adapted to condition air prior to supplying the air to the one or more supply ducts 50. It will be appreciated that airflow units, such as HVAC units, are well known in the art. Therefore, further description of their construction and operation is not necessary for an understanding of disclosed subject matter by a person of skill in the art.

In various embodiments the controller 30 is configured to control operation of the airflow unit 20, and in particular, the flow of air to the vehicle cabin and to the one or more vehicle seats 100 based on one or more of default settings and inputs received from the vehicle occupant. Illustrative details regarding the controller 30 will be provided below by way of non-limiting example.

In various embodiments the vehicle seat 100 is adapted to receive air from the airflow unit 20, such as to provide heating and cooling effects to the vehicle seat 100, to help maintain a comfortable environment for the vehicle occupant sitting therein. As will be discussed in greater detail below, the vehicle seat 100 includes a cushion, such as a seat cushion 112 or a backrest cushion 152 (refer to FIG. 2 below), adapted to provide airflow therethrough. The cushion defines a primary airflow path directed to a primary outlet formed a supporting portion of the cushion, such as in at least one portion chosen from a central portion and a peripheral portion of the cushion and a secondary airflow path directed to a secondary outlet (130,170) formed in a non-supporting portion of the cushion, such as in at least one position at an end of the cushion. In particular, in embodiments, the air is fed, via channels, to primary outlets and to secondary outlets, particularly one or more seat secondary outlets 130 and one or more backrest secondary outlets 170.

In various embodiments, the one or more seat secondary outlets 130 are adapted to direct the airflow towards the legs of the seat occupant, while the one or more backrest secondary outlets 170 are adapted to direct the airflow towards the neck and/or shoulders of the seat occupant. By directing airflow to one or more of the legs, neck, head, arms, and shoulders of the seat occupant, further comfort can be provided to the seat occupant along with the comfort of the occupant provided by the primary outlets centrally positioned in the seat cushion 112 and the backrest cushion 152. Furthermore, unlike the primary outlets, the secondary outlets are positioned in locations of the vehicle seat that will not be blocked and/or obstructed by the seat occupant, such as by the channels being closed as the foam of the cushion deforms upon receiving weight of the seat occupant.

Figure 2:
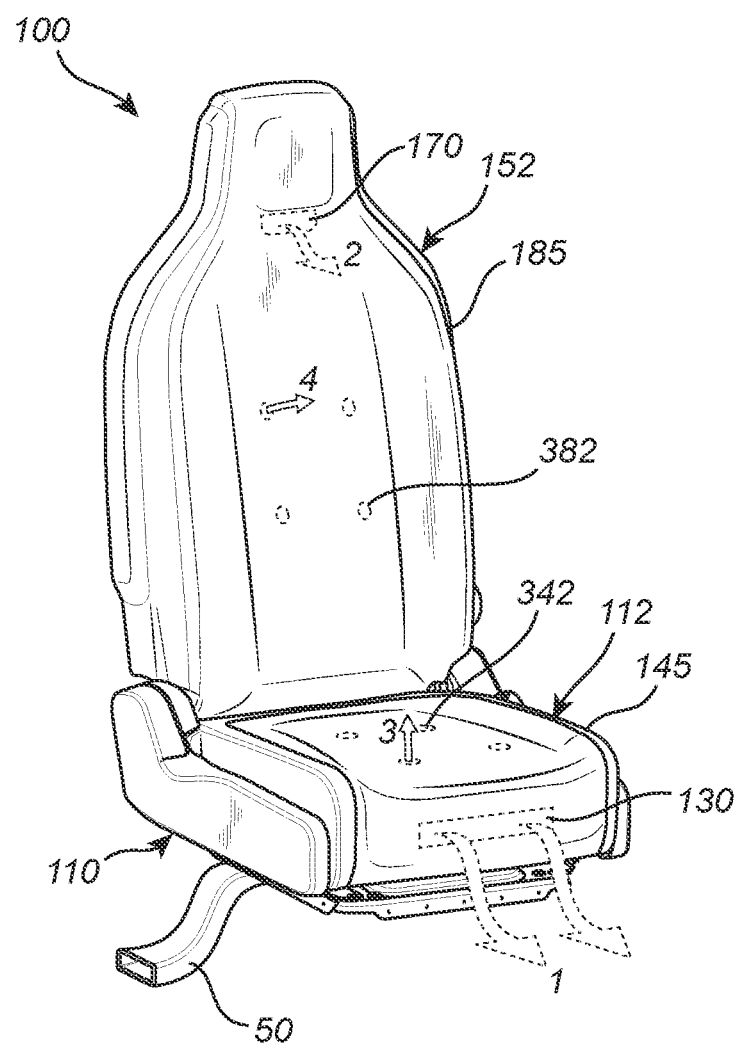
FIG. 2 is a perspective view of one illustrative embodiment of the vehicle seat of FIG. 1 of the present disclosure.

FIG. 2 is a perspective view of one illustrative embodiment of the vehicle seat 100 of FIG. 1 of the present disclosure. Referring now specifically to FIG. 2, in various illustrative embodiments, the vehicle seat 100 includes a seat base 110, a backrest 150, and a headrest 190. The seat base 110 includes a seat cushion 112 and is adapted for a vehicle occupant to sit therein. The backrest 150 is connected to the seat base 110 and extends up therefrom. The backrest 150 includes a backrest cushion 152 and is adapted to provide further support for the vehicle occupant, such as lumbar support. The headrest 190 is positioned at a top of the backrest 150, distal to the seat base 110. In the embodiment illustrated, the headrest 190 is formed integrally with the backrest 150. However, in other embodiments, the headrest 190 is separate from and connected to the backrest 150.

In the illustrative embodiment of FIG. 2, the seat cushion 112 includes a seat covering 145 surrounding one or more of a seat padding 120 and a seat baffle 140 (FIGS. 4-9) and the backrest cushion 152 includes a backrest covering 185 surrounding a backrest padding 160 and a backrest baffle 180 (FIGS. 4-9). Each of the seat covering 145 and the backrest covering 185 are formed from one or more materials, which could include, for example, a porous material, such as a porous leather, a porous synthetic leather (pleather, leatherette, vegan leather), a porous cloth, nylon, and the like, positioned in the central areas thereof and which cover the seat primary outlets 342 and backrest primary outlets 382 for the conditioned air received by the seat 100. The porous material is adapted to allow the air indicated by arrow 3 and arrow 4 to pass therethrough such that the air provides comfort, such as heating or cooling, to the seat occupant.

Along with being positioned in the central areas of the seat cushion 112 and the backrest cushion 152, in the embodiment illustrated in FIG. 2, the porous material is also positioned over the seat secondary outlet 130 and the backrest secondary outlet 170, such as in the locations of the seat secondary outlet 130 and the backrest secondary outlet 170 identified in FIG. 2.

Figure 3:
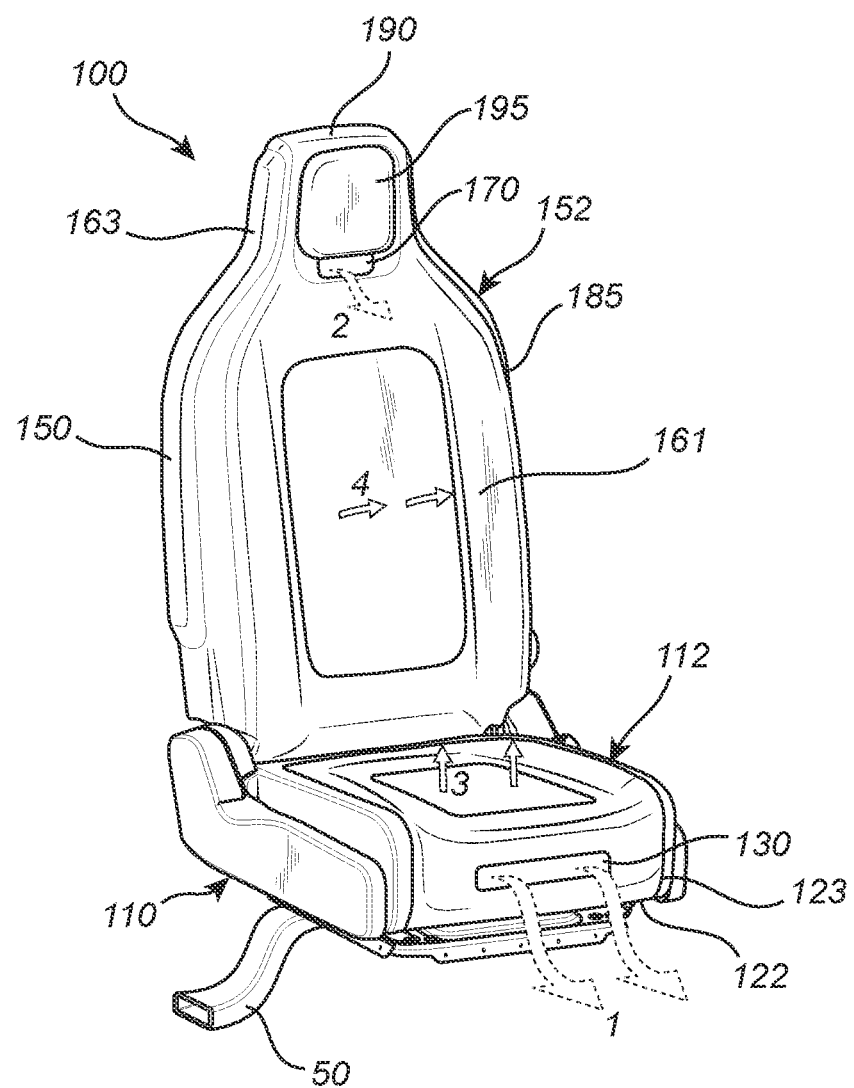
FIG. 3 is a perspective view of an illustrative embodiment of the vehicle seat of FIG. 1 of the present disclosure, highlighting the secondary outlets in the vehicle seat.

FIG. 3 is a perspective view of an illustrative embodiment of the vehicle seat 100 of FIG. 1 of the present disclosure with the seat covering 145 and the backrest covering 185 removed, highlighting the secondary outlets in the vehicle seat 100. Referring now specifically to FIG. 3, in various illustrative embodiments, the seat secondary outlet 130 is positioned in a front 123 of the seat cushion 112, adjacent to a bottom 122 of the seat cushion 112. In the embodiment illustrated, the seat secondary outlet 130 is positioned below the porous material portion of the seat covering 145 (FIG. 2). In some of these embodiments, the seat secondary outlet 130 includes at least one of a separate covering and louvers (not shown) adapted to direct the airflow 1. As can be seen in FIG. 3, the airflow 1 exiting the seat secondary outlet 130 is directed in a forward direction, where the forward direction is the direction that the seat 100 is facing.

In the embodiment illustrated in FIG. 3, the backrest secondary outlet 170 is positioned between the porous material portion of the backrest covering 185 (FIG. 2) and the headrest 190/headrest cushion 195 adjacent to a top 163 of the backrest 150. In some of these embodiments, the backrest secondary outlet 170 includes at least one of a separate covering and louvers adapted to direct the airflow 2. As can be seen in FIG. 3, the airflow 2 exiting the backrest secondary outlet 170 is directed in the forward direction.

Figure 4:
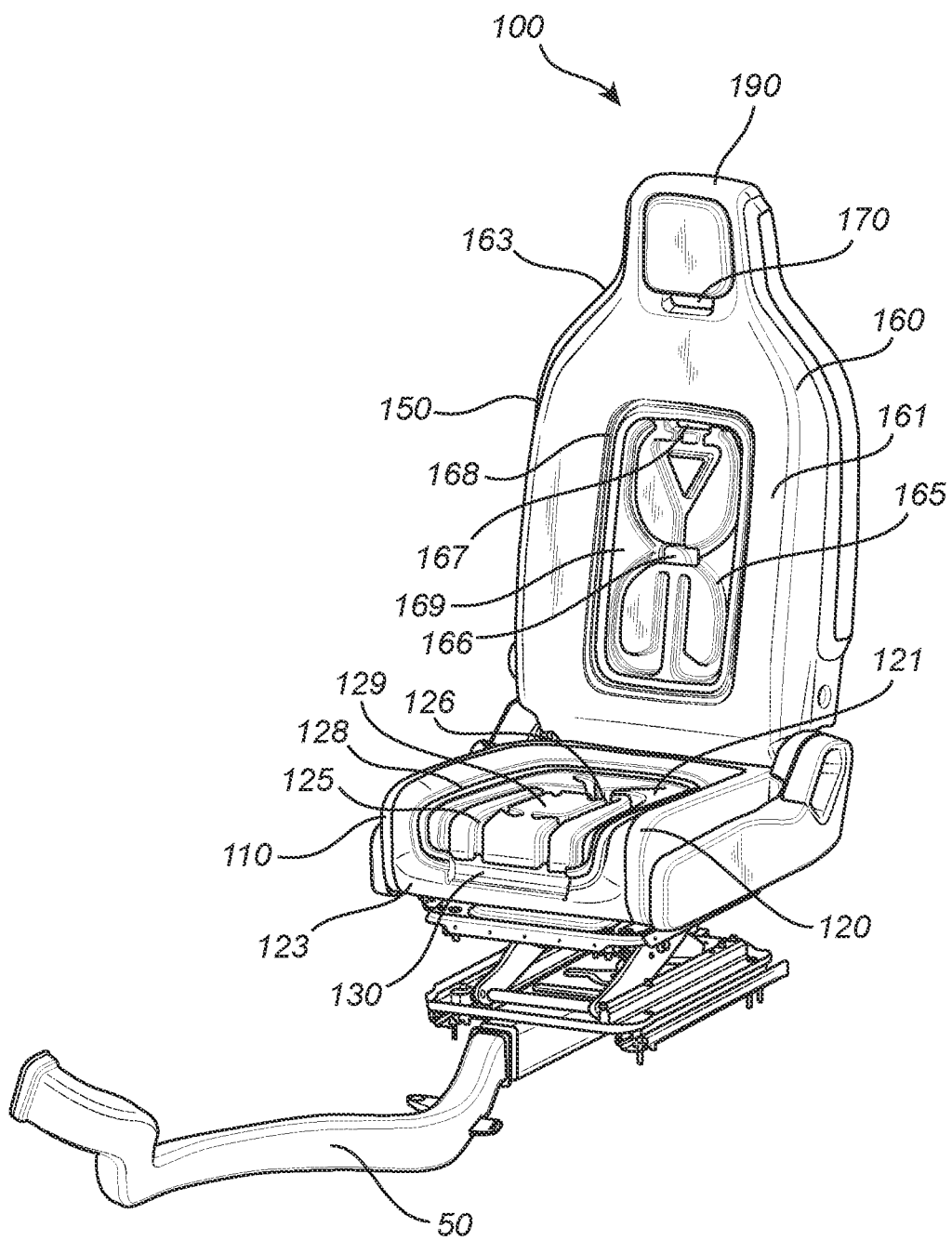
FIG. 4 is a perspective view of an illustrative embodiment of the vehicle seat of FIG. 1 with the seat covering and the backrest covering of the vehicle seat removed and without a seat baffle and a backrest baffle, highlighting airflow channels formed in the padding of the cushions for the vehicle seat.
Figure 5:
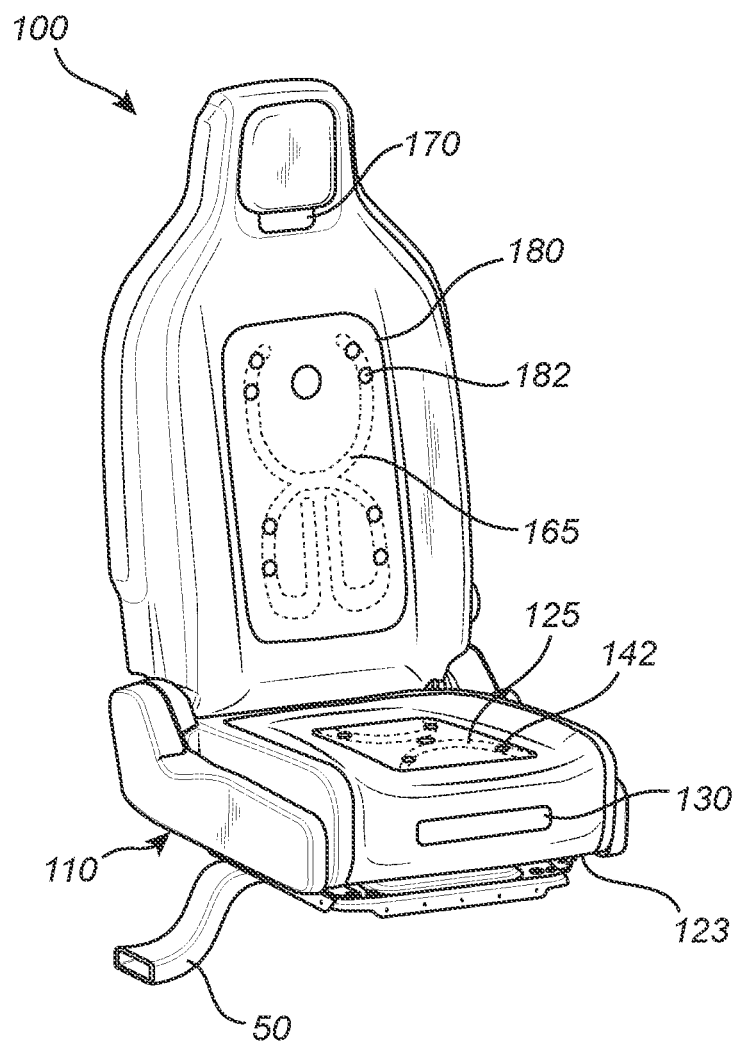
FIG. 5 is a perspective view of an illustrative embodiment of the vehicle seat of FIG. 1 with the seat covering, the backrest covering, and the headrest covering of the vehicle seat removed, highlighting a seat baffle and a backrest baffle and the holes formed therein.

FIG. 4 is a perspective view of another illustrative embodiment of the vehicle seat of FIG. 1 with the seat covering and the backrest covering of the vehicle seat removed and without a seat baffle and a backrest baffle, highlighting airflow channels formed in the padding of the cushions for the vehicle seat. FIG. 5 is a perspective view of an illustrative embodiment of the vehicle seat 100 of FIG. 1 with the seat covering 145, the backrest covering 185, and headrest covering of the seat 100 removed, highlighting a seat baffle and a backrest baffle and the holes formed therein. As will be described in detail below, in various embodiments, the seat cushion 112 includes a seat padding 120 and a seat baffle 140. The backrest cushion 152 includes a backrest padding 160 and a backrest baffle 180. In embodiments, the seat baffle 140 and the backrest baffle 180 define primary zones of the respective seat base 110 and backrest 150, which cover the central portion and the peripheral portion of the cushion and which define the areas of body contact with a vehicle occupant while the vehicle occupant are seated in the vehicle seat 100.

Figure 6:
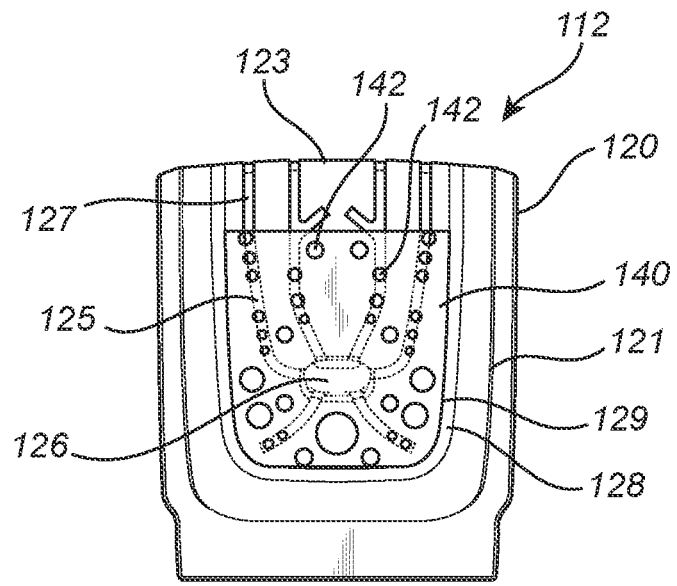
FIG. 6 is a top perspective view of an illustrative embodiment of a seat cushion for the vehicle seat of FIG. 5 of the present disclosure with the seat covering removed, highlighting the seat baffle and the holes therein that define seat primary outlets.

FIG. 6 is a top perspective view of an illustrative embodiment of a seat cushion 112 for the seat 100 of FIG. 5 of the present disclosure with the seat covering 145 removed, highlighting a seat baffle 140 and the holes 142 therein that define seat primary outlets 342. The seat baffle 140 is illustrated semi-transparent to illustrate the seat airflow channels 125 (shown in dashed lines) thereunder. Referring now specifically to FIGS. 4-6, in an illustrative embodiment, the seat padding 120 includes one or more seat inlet channels 126 and seat airflow channels 125 formed therein. The one or more inlet channels 126 fluidly connect the seat airflow channels 125 to a supply duct 50 (FIG. 4), such that airflow, such as conditioned airflow, is supplied to the seat airflow channels 125. In the embodiment illustrated in FIGS. 4-6, the seat padding 120 is shaped to define the seat airflow channels 125 in the top 121 of the seat padding 120, the seat secondary outlet 130, and fluid connections therebetween. In various embodiments, such as the embodiment illustrated in FIGS. 4-6, some of the seat airflow channels 125 extend to the seat secondary outlet 130 to form the fluid connection. In the embodiments, the seat padding 120 is formed of a hard padding material, such as foam. In various embodiments, the hard foam is, without limitation, formed of a foam rubber, a polyurethane foam, and the like.

In the embodiment illustrated in FIGS. 4-6, the seat padding 120 includes an inset 129 forming a shoulder 128 where the seat baffle 140 is received. In various embodiments, a height of the shoulder is based on a thickness of the seat baffle 140. In the embodiment illustrated, the seat airflow channels 125 include arcuate channels extending away from a centrally located inlet channel 126 that extend towards corners of the shoulder 128, and include channels extending from the inlet channel 126 and then linearly toward a front 123 of the seat padding 120 before fluidly connecting to a top of the seat secondary outlet 130. In various embodiments, the seat airflow channels 125 include branches extending from one or more of the linearly extending channels.

Figure 7:
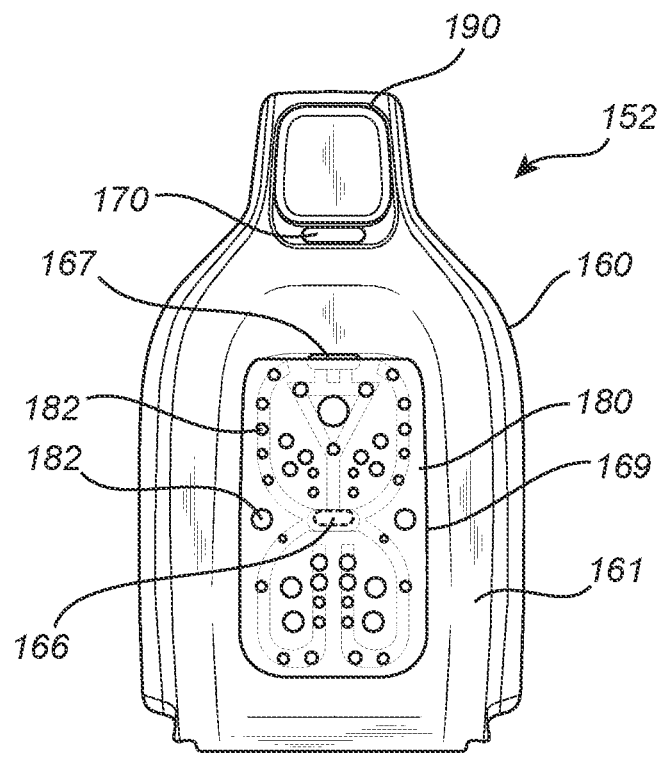
FIG. 7 is a front perspective view of an illustrative embodiment of a backrest cushion for the vehicle seat of FIG. 5 of the present disclosure with the backrest covering removed, highlighting the backrest baffle and the holes therein that define backrest primary outlets.

FIG. 7 is a front perspective view of an illustrative embodiment of a backrest cushion 152 for the vehicle seat 100 of FIG. 5 of the present disclosure with the backrest covering 185 removed, highlighting a backrest baffle 180 and the holes 182 therein that define backrest primary outlets 382. The backrest baffle 180 is illustrated semi-transparent to illustrate the backrest airflow channels 165 (shown in dashed line) thereunder. In various embodiments the backrest padding 160 includes one or more backrest inlet channels 166 and backrest airflow channels 165 formed therein. The one or more backrest inlet channels 166 fluidly connect the backrest airflow channels 165 to a supply duct 50, such that air, such as conditioned air, is supplied to the backrest airflow channels 165. In the embodiment illustrated in FIGS. 4, 5, and 7, the backrest padding 160 is shaped to define the backrest airflow channels 165 in the front 161 of the backrest padding 160, the backrest secondary outlet 170, and fluid connections therebetween, such as a backrest outlet channel 167 that fluidly connects the backrest outlet channel 167 to the backrest airflow channels 165. In other embodiments, one or more backrest airflow channels 165 connect directly to the backrest secondary outlet 170. In various embodiments, the backrest padding 160 is formed of a hard padding material, such as foam. In various embodiments, the hard foam is, without limitation, formed of a foam rubber, a polyurethane foam, and the like.

In the embodiment illustrated in FIGS. 4, 5, and 7, the backrest padding 160 is formed to define an inset 169 forming a shoulder 168 around a perimeter of the backrest airflow channels 165 where a backrest baffle 180 is received. In the embodiment illustrated, the inset 169 includes a rectangular shape. In the embodiment illustrated, the backrest airflow channels 165 include arcuate channels extending away from a centrally located backrest inlet channel 166 that extend towards corners of the rectangular shaped shoulder 168, and include channels extending back towards the backrest inlet channel 166 from one or more of the arcuate shaped channels. In the embodiment illustrated, a triangular shaped channel (in a plane parallel or substantially parallel to the front 161 of the backrest padding 160) is positioned between the backrest inlet channel 166 and the backrest outlet channel 167 with a single channel extending from a vertex of the triangle to the backrest inlet channel 166 and multiple channels extending from an opposing base of the triangle (relative to the vertex connected to the backrest inlet channel) to the backrest outlet channel 167.

Referring again specifically to FIG. 6, in an illustrative embodiment, the seat cushion 112 includes the seat padding 120, a seat baffle 140, and one or more channel spreaders 127. Again, the seat padding 120 is formed with seat airflow channels 125. In various embodiments, one or more channel spreaders 127, such as a spreading foam and a backing layer, are positioned within the seat airflow channels 125 to prevent the channels from being compressed and closed due to the weight of the vehicle occupant. By way of non-limiting example, in various embodiments, the seat airflow channels 125 are at least 10 millimeters deep and 10 millimeters wide, the spreading foam has a thickness greater than 50 percent of the depth of the seat airflow channels 125 and the backing layer has a thickness that is less than 25 percent of the depth of the seat airflow channels 125. While the above example provides various ranges and relationships for the sizing of the seat airflow channel 125 and the backing layer, other ranges, relationships, and sizes for the seat airflow channel 125 and the backing layer are also contemplated.

In various embodiments the seat baffle 140 is positioned between the seat covering 145 and the seat padding 120 and is positioned over the seat airflow channels 125 within the inset 129. In the embodiment illustrated, the seat baffle 140 partially covers the seat airflow channels 125. In other embodiments (FIG. 8), the seat baffle 140 fully covers the seat airflow channels 125. The seat baffle 140 includes holes 142 extending therethrough. As can be seen in FIG. 5, at least some of the holes 142 align with the seat airflow channels 125. The holes 142 are adapted to function as seat primary outlets 342 for the airflow, which are centrally located in the seat cushion 112.

Referring again specifically to FIG. 7, in one illustrative embodiment, the backrest cushion 152 includes the backrest padding 160, a backrest baffle 180, one or more channel spreaders, and a backrest covering 185 (FIGS. 1-3). Again, the backrest padding 160 is formed with backrest airflow channels 165. In various embodiments, one or more channel spreaders, such as a spreading foam and a backing layer, are positioned within the backrest airflow channels 165 to prevent the channels from being compressed and closed due to the weight of the vehicle occupant. By way of non-limiting example, in various embodiments, the backrest airflow channels 165 are at least 10 millimeters deep and 10 millimeters wide, the spreading foam has a thickness greater than 50 percent of the depth of the backrest airflow channels 165 and the backing layer has a thickness that is less than 25 percent of the depth of the backrest airflow channels 165. While the above example provides various ranges and relationships for the sizing of the backrest airflow channel 165 and the backing layer, other ranges, relationships, and sizes for the backrest airflow channel 165 and the backing layer are also contemplated.

The backrest baffle 180 is positioned between the backrest covering 185 and the backrest padding 160 and is positioned over and in front of the backrest airflow channels 165. The backrest baffle 180 is also positioned within the inset 169. In the embodiment illustrated, the backrest baffle 180 covers all of the backrest airflow channels 165. The backrest baffle 180 includes holes 182 extending therethrough. As can be seen in FIG. 7, at least some of the holes 182 align with the backrest airflow channels 165. The holes 182 are adapted to function as backrest primary outlets 382 for the airflow, which are centrally located in the backrest cushion 152.

Figure 8:
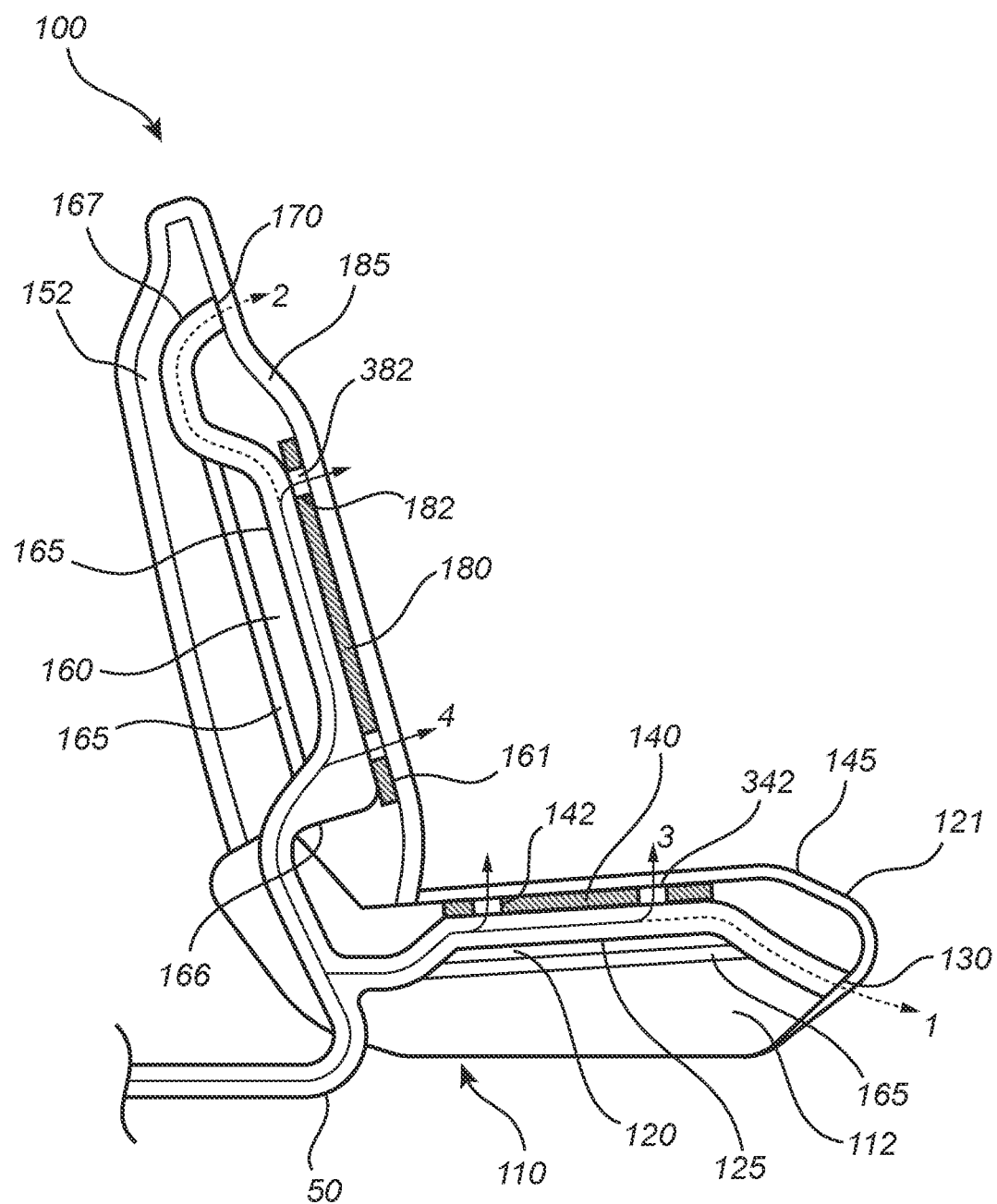
FIG. 8 is a cross-sectional view of an illustrative embodiment of the vehicle seat of FIG. 1 of the present disclosure, highlighting primary flow paths and secondary flow paths of air through the seat cushions.

FIG. 8 is a cross-sectional view of an illustrative embodiment of the vehicle seat 100 of FIG. 1 of the present disclosure, highlighting primary flow paths 3 and 4, and secondary flow paths 1 and 2 of the airflow through the seat cushion and backrest. Referring now specifically to FIG. 8, in one illustrative embodiment, the primary flow path 3 (shown as a solid line with arrows) through the seat padding 120 begins from a supply duct 50 fluidly connected to one or more seat inlet channels 126 and into the seat airflow channels 125, such as those illustrated in FIGS. 4-6. The primary flow path 3 of the air flows through the seat baffle 140 and through the porous portion of the seat covering 145. The primary flow path 3 is directed to the occupant seated in the seat cushion 112 and, in various embodiments, also flows to convectively cool or heat the seat cushion 112, and in particular, the seat padding 120 and the seat baffle 140.

In the embodiment illustrated in FIG. 8, the secondary flow path 1 (shown as a dashed line with arrows) of the air flowing through the seat padding 120 flows along one or more of the seat airflow channels 125 from the seat inlet channel 126 (FIG. 6) to the seat secondary outlet 130. As can be seen in FIG. 8, the air flowing along the secondary flow path 1 and out of the seat secondary outlet 130 is the excess airflow that does not exit the primary flow path 3 through the seat baffle 140. As such, the seat secondary outlet 130 maintains the flow of the air through the seat padding 120 even when one or more of the seat airflow channels 125 and/or seat primary outlets 382 are at least partially blocked by the occupant of the vehicle seat 100.

Similarly, the primary flow path 4 through the backrest padding 160 begins from a supply duct 50 fluidly connected to one or more backrest inlet channels 166 and into the backrest airflow channels 165, such as those illustrated in FIGS. 4, 5, and 7. The primary flow path 4 of the air flows through the backrest baffle 180 and through the porous portion of the backrest covering 185. The primary flow path 4 is directed to the occupant seated in the seat cushion 112 and, in various embodiments, flows to convectively cool or heat the backrest cushion 152, and in particular, the backrest padding 160 and the backrest baffle 180.

In the embodiment illustrated in FIG. 8, the secondary flow path 4 of the air flowing through the backrest padding 160 flows along one or more of the backrest airflow channels 165 from the backrest inlet channel 166 to a backrest outlet channel 167 that directs the airflow to the backrest secondary outlet 170. As can be seen in FIG. 8, the air flowing along the secondary flow path 2 and out of the backrest secondary outlet 170 is the excess airflow that does not exit the primary flow path 4 through the backrest baffle 180. As such, the backrest secondary outlet 170 maintains the flow of the air through the backrest padding 160 even when one or more of the backrest airflow channels 165 and/or backrest primary outlets 382 are at least partially blocked by the occupant of the vehicle seat 100.

In the embodiment illustrated in FIG. 8, a depth of the inset 129 (FIG. 6) formed in the seat padding 120 matches a thickness of the seat baffle 140 such that there is a flush transition at the surfaces thereof. Similarly, a depth of the inset 169 (FIG. 7) formed in the backrest padding 160 matches a thickness of the backrest baffle 180 such that there is a flush transition at the surfaces thereof.

Figure 9:
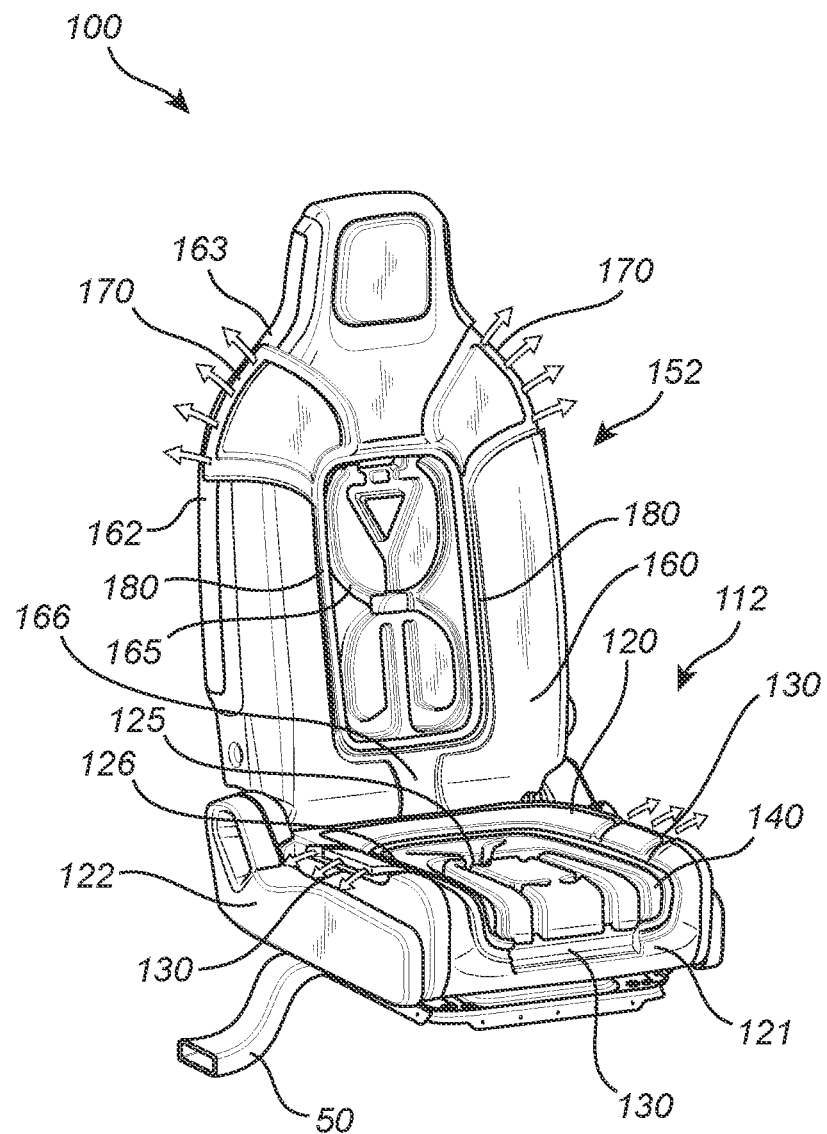
FIG. 9 is a perspective view of an illustrative embodiment of the vehicle seat of FIG. 1 of the present disclosure.

FIG. 9 is a perspective view of another illustrative embodiment of the vehicle seat 100 of FIG. 1 of the present disclosure. Referring now specifically to FIG. 9, in one illustrative embodiment, the seat cushion 112 includes multiple seat secondary outlets 130, one formed in a front 123 of the seat cushion 112 and one formed in each side 122 of the seat cushion 112. One or more seat airflow channels 125 connects to each of the seat secondary outlets 130, such that the airflow has multiple different paths for flowing out of the seat cushion 112 via the seat secondary outlets 130.

Similarly, in some embodiments, the backrest cushion 152 includes multiple backrest secondary outlets 170. In the embodiment illustrated, each backrest secondary outlet is at a shoulder of the backrest cushion 152 extending at the shoulder both at the top 163 and at a side 162 of the backrest cushion 152. One or more of the backrest airflow channels 165 connects to each of the backrest secondary outlets 170, such that the airflow has multiple different paths for flowing out of the backrest cushion 152 via the backrest secondary outlets 170.

Referring to FIGS. 8 and 9, in various embodiments, the seat padding 120 forms seat airflow channels 125 at various depths therein, such as some seat airflow channels 125 at a top 121 of the seat padding 120 adjacent to the seat baffle 140 and some at depths offset from the top 121 of the seat cushion 112. In various embodiments, the depth is selected to ensure that the seat airflow channels 125 offset furthest from the top 121 of the seat cushion 112 remain at least partially unobstructed while an occupant is sitting on the seat cushion 112. In various embodiments, at least one of these deep seat airflow channels 125 is in fluid communication with the seat secondary outlet 130 to ensure that the secondary flow path 1 through the seat padding 120 is never completely obstructed.

Similarly, the backrest padding 160 forms backrest airflow channels 165 at various depths therein, such as some backrest airflow channels 165 at a front 161 of the backrest padding 160 adjacent to the backrest baffle 180 and some at depths offset from the front 161 of the backrest cushion 152. In various embodiments, the depth is selected to ensure that the backrest airflow channels 165 offset furthest from the front 161 of the backrest cushion 152 remain at least partially unobstructed while an occupant is resting back on the backrest cushion 152. In various embodiments, at least one of these deep backrest airflow channels 165 is in fluid communication with the backrest secondary outlet 170 to ensure that the secondary flow path 2 through the backrest padding 160 is never completely obstructed.

Figure 10:
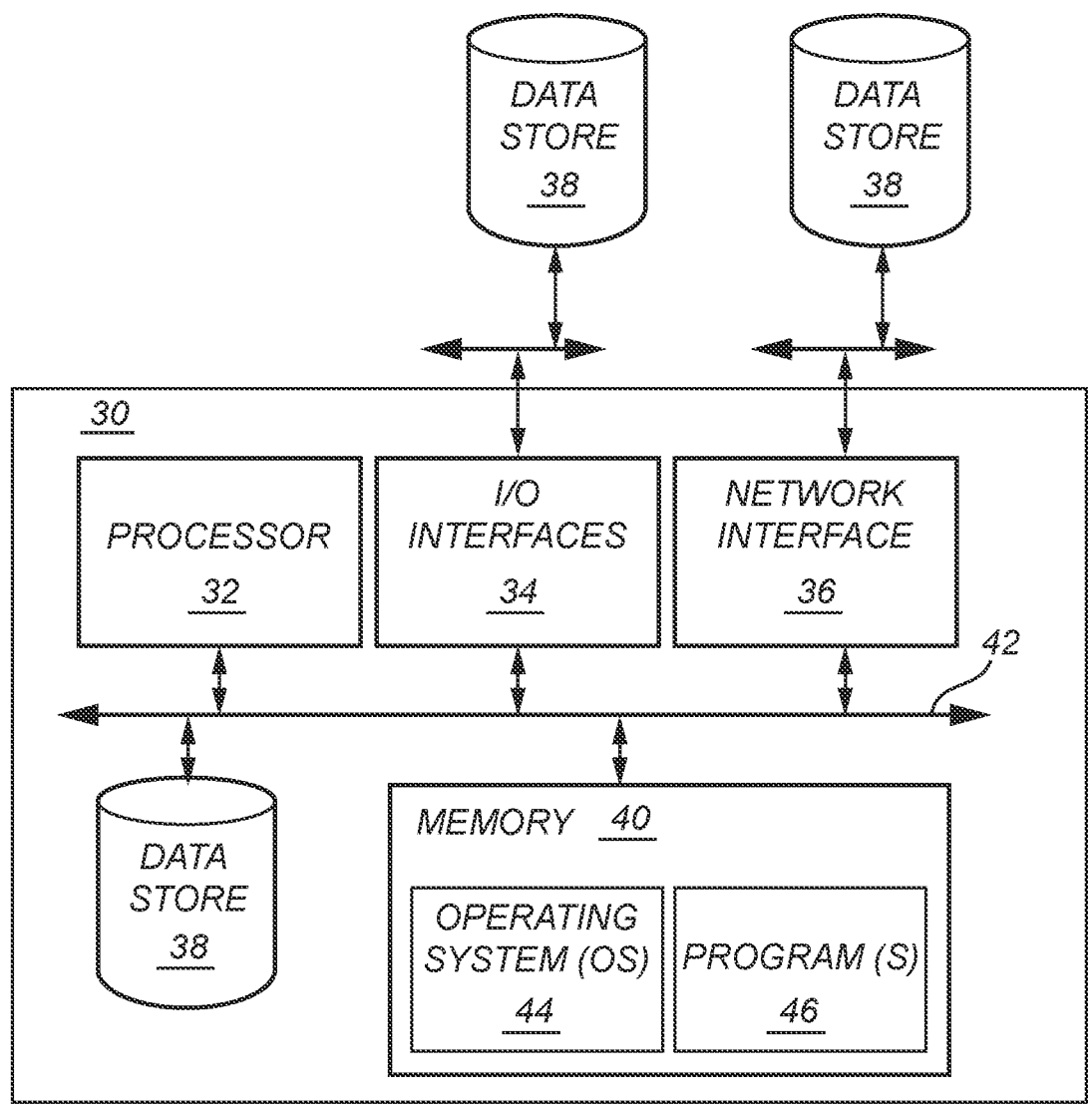
FIG. 10 is a block diagram illustrating an embodiment of the controller of the airflow system of FIG. 1.

FIG. 10 is a block diagram illustrating an embodiment of the controller 30 of the airflow system 10 of FIG. 1. The controller 30 may be a digital computer that, in terms of hardware architecture, generally includes a processor 32, input/output (I/O) interfaces 34, a network interface 36, a data store 38, and memory 40. It should be appreciated by those of ordinary skill in the art that FIG. 10 depicts the controller 30 in an oversimplified manner, and a practical embodiment may include additional components and suitably configured processing logic to support known or conventional operating features that are not described in detail herein. The components (32, 34, 36, 38, and 40) are communicatively coupled via a local interface 42. The local interface 42 may be, for example, but not limited to, one or more buses or other wired or wireless connections, as is known in the art. The local interface 42 may have additional elements, which are omitted for simplicity, such as controllers, buffers (caches), drivers, repeaters, and receivers, among many others, to enable communications. Further, the local interface 42 may include address, control, and/or data connections to enable appropriate communications among the aforementioned components.

The processor 32 is a hardware device for executing software instructions. The processor 32 may be any custom made or commercially available processor, a central processing unit (CPU), an auxiliary processor among several processors associated with the controller 30, a semiconductor-based microprocessor (in the form of a microchip or chip set), or generally any device for executing software instructions. When the controller 30 is in operation, the processor 32 is configured to execute software stored within the memory 40, to communicate data to and from the memory 40, and to generally control operations of the controller 30 pursuant to the software instructions. The I/O interfaces 34 may be used to receive user input from and/or for providing system output to one or more devices or components. The user input may be provided via, for example, a keyboard, touchpad, and/or a mouse. System output may be provided via a display device. I/O interfaces 34 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 36 may be used to enable the controller 30 to communicate on a network, such as the Internet 104. The network interface 36 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 38 may be used to store data. The data store 38 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 38 may incorporate electronic, magnetic, optical, and/ or other types of storage media. In one example, the data store 38 may be located internal to the controller 30, such as, for example, an internal hard drive connected to the local interface 42 in the controller 30. Additionally, in another embodiment, the data store 38 may be located external to the controller 30 such as, for example, an external hard drive connected to the I/O interfaces 34 (e.g., SCSI or USB connection).

The memory 40 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 40 may incorporate electronic, magnetic, optical, and/or other types of storage media. Note that the memory 40 may have a distributed architecture, where various components are situated remotely from one another, but can be accessed by the processor 32. The software in memory 40 may include one or more software programs, each of which includes an ordered listing of executable instructions for implementing logical functions. The software in the memory 40 includes a suitable operating system (O/S) 44 and one or more programs 46. The operating system 44 essentially controls the execution of other computer programs, such as the one or more programs 46, and provides scheduling, input-output control, file and data management, memory management, and communication control and related services. The one or more programs 46 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 11:
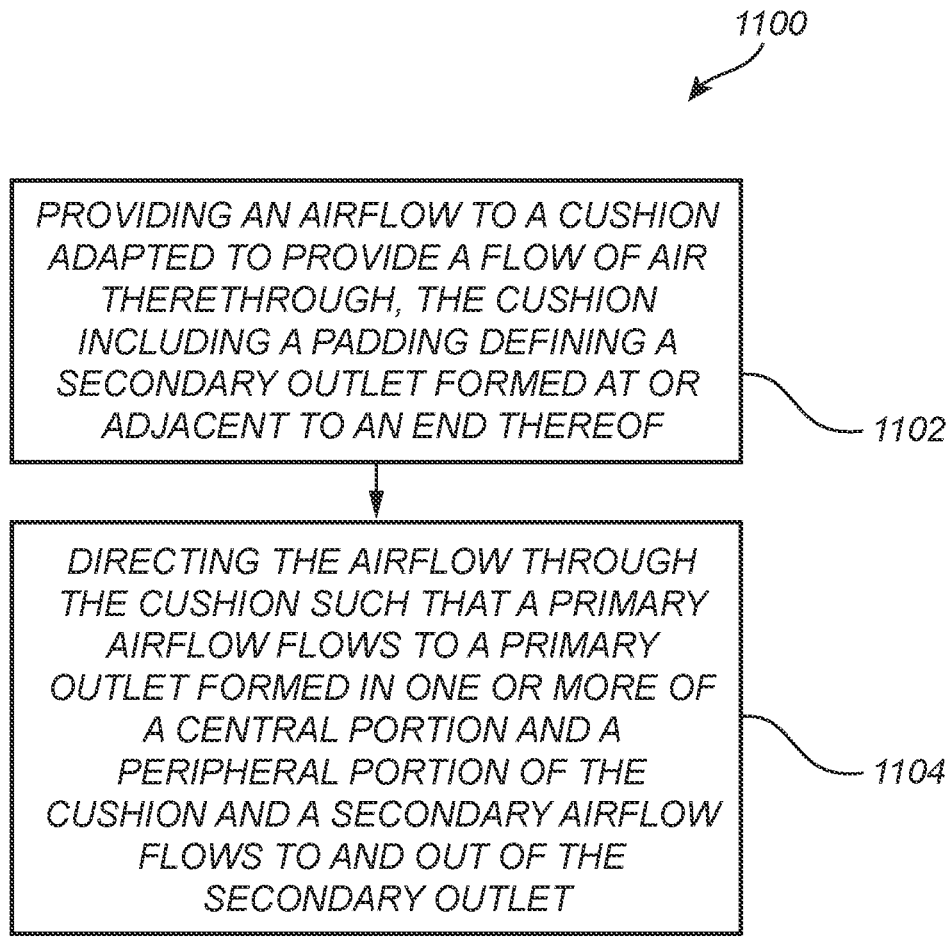
FIG. 11 is a flowchart of a method for providing airflow in a vehicle via a vehicle seat.

FIG. 11 is a flowchart of a method 1100 for circulating airflow through a vehicle seat 100. The method 1100 includes providing an airflow to a cushion adapted to provide a flow of air therethrough, the cushion including a secondary outlet formed at or adjacent to an end of the cushion at step 1102. The method also includes directing the airflow through the cushion such that a primary airflow flows to a central portion of the cushion and a secondary airflow flows to and out of the secondary outlet at step 1104. The cushion and the secondary outlet can be any suitable cushion and outlet as desired, such as without limitation any variation of the seat cushion, backrest cushion, the seat secondary outlet, and the backrest secondary outlet disclosed herein.

In various embodiments, a baffle adjoins the central portion of the cushion, the baffle adapted to receive and direct the primary airflow therethrough, a covering including a porous portion is positioned over the baffle, and the porous portion adapted for the primary airflow to flow therethrough. The baffle can be any suitable baffle as desired, such as without limitation any variation of the seat baffle and the backrest baffle disclosed herein.

In various embodiments, a covering including a porous portion is positioned over the baffle. The covering can be any suitable covering as desired, such as without limitation any variation of the seat covering and the backrest covering disclosed herein.

In various embodiments, the cushion, the baffle, and the covering form part of a seat base, the baffle adjoins a top of the cushion, and the secondary outlet is positioned at a front of the cushion and adapted to direct the conditioned air in a forward direction relative to the vehicle seat. In some of these embodiments, the method further includes: providing the airflow to a backrest cushion. The backrest cushion includes a backrest padding that includes a backrest inlet channel, backrest airflow channels, and a backrest secondary outlet formed therein. The backrest inlet channel is adapted to receive the airflow from the supply duct. The backrest airflow channels are in fluid communication with the backrest inlet channel and are adapted to provide a backrest primary airflow of the air to a central portion of a front of the backrest cushion. The backrest secondary outlet is positioned at or adjacent to a top of the backrest cushion. The secondary outlet is in flow communication with at least one of the airflow channels and is adapted to direct a backrest secondary airflow out of the backrest cushion. In these embodiments, the method yet further includes directing a portion of the airflow to the backrest inlet channel via the supply duct, such that at least a portion of the airflow directed to the backrest inlet channel follows to the backrest secondary airflow and exits the backrest padding via the backrest secondary outlet.

In some these embodiments, a backrest baffle adjoins the front of the backrest padding at a central portion thereof and is adapted to receive and direct the backrest primary airflow therethrough, and a backrest covering including a backrest porous portion positioned over the backrest baffle. The backrest covering is adapted for the primary airflow to flow therethrough. The backrest inlet channel, the backrest airflow channels, and the backrest secondary outlet can be any suitable backrest inlet channel, the backrest airflow channels, and the backrest secondary outlet as desired, such as without limitation any variation of the backrest inlet channel, the backrest airflow channels, and the backrest secondary outlet disclosed herein.

Again, air is directed through airflow channels formed in one or more cushions of the seat, such as the seat cushion and the backrest cushion. The airflow channels direct the conditioned air through padding of the cushion and to primary outlets, that are centrally located in the cushion and generally located at the surfaces of the cushion that adjoin the occupant in the vehicle seat. The primary outlets and primary path(s) are in the portion of the seat which receives input airflow first (closest to the inlet). Thus, in embodiments, the primary outlets and primary path(s) are located in primary zones, which are the zones of the cushions that are the areas of direct body contact with a vehicle occupant while the vehicle occupant is seated within the vehicle seat.

At least one of the airflow channels directs the airflow to secondary outlets that are located at or adjacent to an end and an edge of the cushion, such as at a front of the padding of the seat cushion or at a top of the padding of the backrest cushion. The secondary outlets and the secondary path(s) are in the portion of the seat which receives input airflow second (further from the inlet). Thus, in embodiments, the secondary outlets and the secondary path(s) are located in secondary zones, which are zones of the cushions that are the areas that are generally without direct body contact with the vehicle occupant while the vehicle occupant is seated within the vehicle seat.

As such, in various embodiments, when an occupant is not sitting, the primary zones receive the majority of the airflow and are not obstructed by the vehicle occupant. Without the obstructions of the vehicle occupant, the airflow freely flows across these primary zones and conditions the vehicle seat while the vehicle seat is unoccupied. The secondary outlets may still receive some airflow in the non-sitting condition, but it will be minimal, as secondary outlets are located furthest from the inlet. As the secondary outlets are located in non-contact areas (that is, areas where the occupant is not in contact with the seat), conditioning the secondary outlets while the vehicle occupant is not sitting may not be necessary.

When the vehicle occupant is seated in the seat, the primary zones are obstructed, either partially or fully, by the vehicle occupant. To ensure that conditioned airflow continues to flow through the vehicle seat, the secondary outlets are positioned in the secondary zones where the vehicle occupant will not fully obstruct them (e.g., where the occupant is not in contact with the seat). Since the secondary outlets are furthest from the inlets, the airflow continues through the primary zone distribution layers as well. This means that even when the primary zone outlets are obstructed by the occupant (partially or fully), the primary zones still receive conditioning, which convectively cools the cushion(s). In various embodiments, the secondary zones are located in areas where, when the vehicle occupant is sitting, the vehicle occupant will receive additional conditioning in beneficial areas, such as the head, neck, shoulders, arms, legs, feet, back of knees, and the arms.

As such, in embodiments, the flow split between the primary and secondary outlets is dependent on whether the vehicle occupant is sitting in the vehicle seat or not sitting in the vehicle seat. However, due to the configuration of the primary outlets, secondary outlets, and the channels in the cushion, the system can respond automatically to the best-case condition for the vehicle occupant.

The term processor, as used in the foregoing/following disclosure, may refer to a collection of one or more components (such as computer processors and their components) that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of processor (e.g., at a first time), as a second type of processor (e.g., at a second time, which may in some instances coincide with, overlap, or follow a first time), and/or as a third type of processor (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first processor that has a first purpose, then a second processor that has a second purpose and then, a third processor that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different component in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A vehicle seat comprising:
   a cushion adapted to provide airflow therethrough, the cushion defining a primary airflow path directed to a primary outlet formed in a supporting portion of the cushion, the supporting portion of the cushion adapted to receive direct body contact with a vehicle occupant while the vehicle occupant is seated within the vehicle seat, and a secondary airflow path directed to a secondary outlet formed in a non-supporting portion of the cushion;
   padding defining an inlet channel adapted to receive an airflow from a supply duct and a plurality of airflow channels in fluid communication with the inlet channel, the plurality of airflow channels defining the primary airflow path adapted to provide a primary airflow to the primary outlet and defining the secondary airflow path adapted to provide the secondary airflow to the secondary outlet, the secondary outlet being formed at an end of the padding; and
   a baffle adjoining the padding and defining the primary outlet, the baffle adapted to receive and direct the primary airflow therethrough.

2. The vehicle seat of claim 1, wherein the supporting portion of the cushion is formed in at least one portion of the cushion chosen from a central portion and a peripheral portion of the cushion and the non-supporting portion of the cushion is formed in at least one position at an end of the cushion.

3. The vehicle seat of claim 1, wherein at least one channel in the cushion defining a portion of the secondary airflow path is positioned at a depth further from a surface of the cushion than channels in the cushion defining the primary airflow path.

4. The vehicle seat of claim 1, wherein the padding and the baffle form part of a seat base, the baffle adjoins a top of the padding, and the secondary outlet is positioned at a front of the padding and adapted to direct the secondary airflow in a forward direction relative to the vehicle seat.

5. The vehicle seat of claim 4, further comprising a backrest extending from the seat base, the backrest comprising:
   a backrest padding defining a backrest inlet channel, a plurality of backrest airflow channels, and a backrest secondary outlet, the backrest inlet channel being adapted to receive the airflow from the supply duct, the plurality of backrest airflow channels are in fluid communication with the backrest inlet channel and are adapted to provide a backrest primary airflow of the air to a central portion of a front of the backrest cushion, and the backrest secondary outlet being positioned at or adjacent to a top of the backrest cushion, the secondary outlet being in fluid communication with at least one of the plurality of airflow channels and is adapted to direct a backrest secondary airflow of out of the backrest padding; and
   a backrest baffle adjoining the front of the backrest padding at the central portion thereof defining a backrest primary outlet adapted to receive and direct the backrest primary airflow therethrough.

6. The vehicle seat of claim 1, wherein the padding and the baffle form part of a backrest, the baffle adjoins a front of the padding, and the secondary outlet is positioned at a top of the padding and adapted to direct the secondary airflow out of the padding at the top thereof.

7. An airflow system for a vehicle, the airflow system comprising:
   an airflow unit including a controller adapted to control a flow of air;
   a supply duct adapted to direct the air from the airflow unit; and
   a vehicle seat including:
      a cushion adapted to receive the air from the supply duct and provide airflow therethrough, the cushion defining a primary airflow path directed to a primary outlet formed in a supporting portion of the cushion, the supporting portion of the cushion adapted to receive direct body contact with a vehicle occupant while the vehicle occupant is seated within the vehicle seat, and a secondary airflow path directed to a secondary outlet formed in a non-supporting portion of the cushion;
      padding defining an inlet channel adapted to receive an airflow from a supply duct and a plurality of airflow channels in fluid communication with the inlet channel, the plurality of airflow channels defining the primary airflow path adapted to provide a primary airflow to the primary outlet and defining the secondary airflow path adapted to provide the secondary airflow to the secondary outlet, the secondary outlet being formed at an end of the padding; and
      a baffle adjoining the padding and defining the primary outlet, the baffle adapted to receive and direct the primary airflow therethrough.

8. The airflow system of claim 7, wherein the supporting portion of the cushion is formed in at least one portion of the cushion chosen from a central portion and a peripheral portion of the cushion and the non-supporting portion of the cushion is formed in at least one position at an end of the cushion.

9. The airflow system of claim 7, wherein at least one channel in the cushion defining a portion of the secondary airflow path is positioned at a depth further from a surface of the cushion than channels in the cushion defining the primary airflow path.

10. The airflow system of claim 7, wherein the padding and the baffle form part of a seat base, the baffle adjoins a top of the padding, and the secondary outlet is positioned at a front of the padding and adapted to direct the secondary airflow in a forward direction relative to the vehicle seat.

11. The airflow system of claim 10, wherein the vehicle seat further comprises a backrest extending from the seat base, the backrest comprising:
   a backrest padding defining a backrest inlet channel, a plurality of backrest airflow channels, and a backrest secondary outlet, the backrest inlet channel being adapted to receive the airflow from the supply duct, the plurality of backrest airflow channels are in fluid communication with the backrest inlet channel and are adapted to provide a backrest primary airflow of the air to a central portion of a front of the backrest cushion, and the backrest secondary outlet being positioned at or adjacent to a top of the backrest cushion, the secondary outlet being in flow communication with at least one of the plurality of airflow channels and is adapted to direct a backrest secondary airflow of out of the backrest padding; and
   a backrest baffle adjoining the front of the backrest padding at the central portion thereof defining a backrest primary outlet adapted to receive and direct the backrest primary airflow therethrough.

12. The airflow system of claim 7, wherein the padding and the baffle form part of a backrest, the baffle adjoins a front of the padding, and the secondary outlet is positioned at a top of the padding and adapted to direct the secondary airflow out of the padding at the top thereof.

13. A vehicle comprising:
  a cabin;
  an airflow system including an airflow unit with a controller adapted to control a flow of air and a supply duct adapted to direct the air from the airflow unit; and
  a vehicle seat disposed in the cabin, the vehicle seat including:
    a cushion adapted to receive the air from the supply duct and provide airflow therethrough, the cushion defining a primary airflow path directed to a primary outlet formed in a supporting portion of the cushion, the supporting portion of the cushion adapted to receive direct body contact with a vehicle occupant while the vehicle occupant is seated within the vehicle seat, and a secondary airflow path directed to a secondary outlet formed in a non-supporting portion of the cushion;
    padding defining an inlet channel adapted to receive an airflow from a supply duct and a plurality of airflow channels in fluid communication with the inlet channel, the plurality of airflow channels defining the primary airflow path adapted to provide a primary airflow to the primary outlet and defining the secondary airflow path adapted to provide the secondary airflow to the secondary outlet, the secondary outlet being formed at an end of the padding; and
    a baffle adjoining the padding and defining the primary outlet, the baffle adapted to receive and direct the primary airflow therethrough.

14. The vehicle of claim 13, wherein the supporting portion of the cushion is formed in at least one portion of the cushion chosen from a central portion and a peripheral portion of the cushion and the non-supporting portion of the cushion is formed in at least one position at an end of the cushion.

15. The vehicle of claim 13, wherein at least one channel in the cushion defining a portion of the secondary airflow path is positioned at a depth further from a surface of the cushion than channels in the cushion defining the primary airflow path.

16. The vehicle of claim 13, wherein the padding and the baffle form part of a seat base, the baffle adjoins a top of the padding, and the secondary outlet is positioned at a front of the padding and adapted to direct the secondary airflow in a forward direction relative to the vehicle seat.

17. The vehicle of claim 16, wherein the vehicle seat further comprises a backrest extending from the seat base, the backrest comprising:
  a backrest padding defining a backrest inlet channel, a plurality of backrest airflow channels, and a backrest secondary outlet, the backrest inlet channel being adapted to receive the airflow from the supply duct, the plurality of backrest airflow channels are in fluid communication with the backrest inlet channel and are adapted to provide a backrest primary airflow of the air to a central portion of a front of the backrest cushion, and the backrest secondary outlet being positioned at or adjacent to a top of the backrest cushion, the secondary outlet being in flow communication with at least one of the plurality of airflow channels and is adapted to direct a backrest secondary airflow of out of the backrest padding; and
  a backrest baffle adjoining the front of the backrest padding at the central portion thereof defining a backrest primary outlet adapted to receive and direct the backrest primary airflow therethrough.

* * * * *